United States Patent [19]

Pfirmann et al.

[11] Patent Number: 5,693,717

[45] Date of Patent: Dec. 2, 1997

[54] METHOD FOR THE PRODUCTION OF BRANCHED POLYMERIZATES

[75] Inventors: Martina Pfirmann, Griesheim; Werner Siol, Darmstadt; Klaus Koralewski, Riedstadt; Michael Wicker, Seeheim-Jugenheim, all of Germany

[73] Assignee: Roehm GmbH Chemische Fabrik, Darmstadt, Germany

[21] Appl. No.: 673,110

[22] Filed: Jul. 1, 1996

[30] Foreign Application Priority Data

Jul. 1, 1995 [DE] Germany .................. 195 24 053.7

[51] Int. Cl.$^6$ ...................................................... C08F 8/30
[52] U.S. Cl. ..................... 525/296; 525/293; 525/298; 525/301; 525/302; 526/87; 526/286; 526/319; 526/329.7
[58] Field of Search .............................. 525/293, 298, 525/301, 302, 296; 526/87, 286, 319, 329.7

[56] References Cited

U.S. PATENT DOCUMENTS

| | | | |
|---|---|---|---|
| 5,194,540 | 3/1993 | Yamamoto | 526/222 |
| 5,247,040 | 9/1993 | Amick | 526/286 |
| 5,252,678 | 10/1993 | Yamamoto | 525/387 |
| 5,314,977 | 5/1994 | Amick | 526/286 |
| 5,385,996 | 1/1995 | Rizzardo | 526/240 |

*Primary Examiner*—Fred Zitomer
*Attorney, Agent, or Firm*—Oblon, Spivak, McClelland, Maier & Neustadt, P.C.

[57] ABSTRACT

A method for producing branched polymerizates by radical polymerization of monomers in two stages comprising in a first stage, adding 10 to 500 parts by weight of at least one monomer $M_1$ and 0.1 to 20 parts by weight of a mercaptan with an olefinic, radically polymerizable double bond RM as a molecular weight regulator, and polymerizing said at least one monomer $M_1$ mercaptan RM to form a copolymer $MM_1$ in the presence of at least one polymerization initiator and 0 to 100 parts by weight of an inert, non-aqueous solvent, which completely dissolves the monomer $M_1$, the mercaptan RM and the copolymer $MM_1$, where the polymerizable double bonds of $M_1$ and RM have a reactivity, expressed by a copolymerization parameter r, between 0.1 and 10, and in a second stage, adding 10 to 2000 parts by weight of a monomer $M_2$ and 0.01 to 10 parts by weight of a saturated molecular weight regulator, and optionally, an inert, non-aqueous solvent, to the reaction mixture formed in the first stage, and polymerizing in the presence of at least one polymerization initiator to form a branched polymerizate.

Branched polymerizates made by the method.

10 Claims, No Drawings

METHOD FOR THE PRODUCTION OF BRANCHED POLYMERIZATES

BACKGROUND OF THE INVENTION

1. Field of the Invention

The invention relates to a method for the production of branched polymerizites P by means of at least two-stage polymerization of monomers $M_1$ and $M_2$, optionally in the presence of inert, non-aqueous solvents L, in which a mercaptan RM with an olefinic, radically polymerizable double bond is used as a molecular weight regulator in the first stage, as well as to uses for polymerizates P produced in this manner.

2. Description of the Background

Branched polymerizates, particularly comb polymers, are generally produced by polymerization of macromonomers, optionally with other monomers.

By definition, macromonomers represent polymers with an end group capable of polymerization, particularly a radically polymerizable end group, with mean molecular weights $M_w$ of 500 to about $10^5$ daltons, particularly from 2000 to $5 \times 10^4$ daltons (for the determination of $M_w$, see, for example, H. F. Mark et al., Encyclopedia of Polymer Science and Technology, 2nd Ed., Vol. 10, pages 1 to 19, J. Wiley, N.Y., 1989).

The production of macromonomers is described in detail in the literature (see, for example, P. F. Rempp, E. Franta, Adv. Polym. Sci. 58, 1 (1984); K. Albrecht, W. Wunderlich, Angew. Makromol. Chem. (Applied Macromolecular Chemistry) 145/146, 89–100 (1986); H. F. Mark et al., Encyclopedia of Polymer Science and Technology, 2nd Ed., Vol. 9, pages 195–204, J. Wiley (1989); T. Corner, Adv. Polym. Sci. 62, 95–141 (1984); P. Rempp and E. Franta. Adv. Polym, Sci. 58, 1–50 (1984); DE-PS 27 23 905 or U.S. Pat. No. 3,390,206).

Macromonomers are known to be obtainable via anionic and cationic "living polymerization," or via radical polymerization, where the end group capable of polymerization is usually introduced upon initiation or at the chain break, or by means of a subsequent chemical conversion. Another possibility for the production of macromonomers is offered by "Group Transfer Polymerization" (GTP: see, for example H. F. Mark et al,. Encyclopedia of Polymer Science and Technology, 2nd Ed., Vol. 10, pages 1–19, J. Wiley, 1989).

A method for the production of comb polymers based on an acrylate which form elastomers, is described, for example, in DE-A 39 02 653, where the comb polymers are composed of 95 to 50% by weight of acrylate monomers and at 5 to 50% by weight of macromonomers consisting of a polyvinyl unit with a vinyl end group, where the polyvinyl unit consists of monomer units selected from the group of acrylates, methacrylates and styrenes, optionally substituted, as well as having a glass transition temperature $T_g$ of at least 60° C. and a mean molecular weight of 500 to $10^5$ daltons.

EP-A 357 036 comprises a method for the production of comb polymers in which macromonomers with vinyl end groups and mean molecular weights between 3000 and 50000 daltons are mixed with vinyl monomers and a polymerization initiator, in a solvent which dissolves the macromonomers well and has a solubility in water of more than 10% by weight at 30° C., and where the resulting mixture is subjected to aqueous suspension polymerization.

In DE-A 40 10 893, a method for the production of acrylic elastomers is described, where alkyl acrylates and alkoxyalkyl acrylates are polymerized in the presence of an organic peroxide with a non-conjugated double bond as the polymerization initiator, as well as in the presence of molecular weight regulators containing mulfur and having non-conjugated double bonds.

In EP-A 520 668, a two-stage process in aqueous emulsion for the production of branched polymerizates is described, where in the first stage, macromonomers with end vinyl groups are formed by the polymerization of ethylene-unsaturated monomers in the presence of mercaptans with olefinic groups, which macromonomers are converted to branched copolymerizates with other ethylene-unsaturated monomers in the second stage.

The state of the art methods for the production of branched polymerizates which have macromonomer units as comonomer units mostly comprise separate production and isolation of the macromonomers, before they are converted to branched end products by means of polymerization, optionally with other monomers.

While EP-A 520 668 offers a method for the production of branched polymerizates by means of copolymerization of macromonomers with other monomers, in which the macromonomers produced in the intermediary stage are subsequently directly polymerized further, this method has a disadvantage that it is carried out in aqueous emulsion. Depending on the area of use of the branched polymerizates, this requires rather complicated processing of the resulting polymer dispersion to remove the polymer emulsifiers. This is particularly true when branched polymerizates are used as thermoplastic elastomers with high transparency. The method disclosed in EP-A 520 668 is further limited in that comb polymerizates are produced almost exclusively because of the reactivity difference between the unsaturated group of the monomers used for the production of the macromonomers and the olefinic group of the mercaptans used as molecular weight regulators, which practically prevents inclusion of the mercaptans into the macromonomers via polymerization of the unsaturated group.

Thus, a need exists for a method for the production of branched polymerizates which is simple to carry out and allows easy isolation of the branched polymerizates.

SUMMARY OF THE INVENTION

Surprisingly, it was found that branched polymerizates P with special properties can be produced by means of the following two-stage method:

In the first stage, 10 to 500 parts by weight of at least one monomer $M_1$ is polymerized in the presence of 0.1 to 20 parts by weight of a mercaptan RM with an olefinic, radically polymerizable double bond and, optionally, in the presence of 0 to 100 parts by weight of a non-aqueous solvent L, using at least one polymerization initiator PI, to form copolymer $MM_1$, where the polymerizable double bonds of the monomer $M_1$ and of the mercaptan RM have a comparable reactivity, and where the monomer $M_1$, the mercaptan RM and the copolymer $MM_1$ are completely soluble in the non-aqueous solvent L, or in a monomer $M_2$, described below.

In the second stage, 10 to 2000 parts by weight of at least one monomer $M_2$, which can be different from $M_1$, and optionally, 10 to 1000 parts by weight of non-aqueous solvent L, are added to the reaction mixture of the first stage, and polymerizod in the presence of 0.01 to 10 parts by weight of a saturated moteculmr weight regulator GM, and polymerization initiators PI.

Preferably, the monomers $M_1$ and $M_2$ are acrylic or methacrylic compounds with the Formula I:

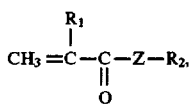

where $R_1$ is hydrogen or methyl $R_2$ is alkyl, aryl or cycloalkyl optionally substituted with a group containing 1 to 30 carbon atoms, and Z is O, NH or $NR_2$ or $(O-(CH_2)_x)_m-O$, where x is a whole number between 2 and 6 and m is a whole number between 1 and 50.

The resulting branched polymerizate P has a high degree of branching, expressed by a comparatively low inertia radius of the polymer molecules at a relatively high molecular weight, and can be used, for example, as a viscosity index improvement agent in lubricant oils, as a raw material for lacquers or adhesives, and as a thermoplastic elastomer.

DESCRIPTION OF THE PREFERRED EMBODIMENTS

It is preferred to conduct the two reaction stages in a direct sequence, and particularly preferred to conduct them in the same reaction vessel.

It is furthermore preferred to use a method in which the synthesis of the regulator monomers (mercaptans) RM only takes place immediately before the reaction stages described above are carried out. It is advantageous if the transfer constants C of the regulator monomers RM with regard to the monomers $M_1$ to be polymerized are in the range between 0.1 and 20, particularly advantageous between 0.4 and 2. The polymerizing group of regulator monomers RM should have an r-parameter, with reference to the monomers $M_1$, in the range between 0.1 and 10, preferably 0.2 and 3 (for a definition of the transfer constant and the r-parameter see, for example: J. Brandrup, E. H. Immergut, Polymer Handbook, 3rd Ed., pages II/81 to 152 and pages II/153–266; J. Wiley, N.Y., 1989).

The First Reaction Stage

The monomers $M_1$ are polymerized, with the regulator monomers RM being added, using radical polymerization (see in this regard, for example, H. Rauch-Puntigam, Th. V ölker, "Acryl- und Methacrylverbindungen " (Acrylic and Methacrylic Compounds), Springer, Berlin, N.Y., 1967). Preferably, radical formers, from which the starter radicals are released by means of thermal splitting, are used as the polymerization initiators PI; preferably, these are azo compounds and/or peroxide compounds.

As examples of azo compounds, the following can be used: 1,1'-azobis-(cyclohexane-1-nitrile), 2,2'-azobis-(ethyl isobutyrate), 4,4'-azobis-(4-cyanovalerianic acid), 2,2'-azobis-(isobutylhydrazide), azobis-(isobutanol), 2,2'-azobis-(2,4-dimethyl valeronitrile), and preferably 2,2'-azobis-(isobutyronitrile). As examples of peroxide compounds, the following can be used: dicyclohexylperoxide, cumolhydroperoxide, t-butyl perbenzoate, t-butyl perpivilate, t-butyl perisononanoate, dibenzoylperoxide, diisopropyl peroxydicarbonate, dilauryl peroxide, 2,2-bis-(t-butyl peroxy)butane, t-butyl hydroperoxide, t-amyl perneodecanoate, t-amyl peroctoate, t-amyl perpivilate, and preferably t-butyl perneodecanoate.

In general, inert, non-aqueous solvents with a boiling point range between 50° and 200° C., preferably between 80° and 150° C., are used as the solvent L, in which the macromonomers $M_1$, the regulator monomers RM and the macromonomers $MM_1$ which form, which are terminated by the regulator monomers RM, dissolve completely. The solvents L generally have transfer constants C of less than $10^{-3}$. Examples of solvents L are: acetone, alkylated benzenes, such as toluene, and preferably butyl acetate. The solvent L can be eliminated entirely. This is particularly true if the monomers $M_1$ and $M_2$ are chemically identical in the first and second stage, for example, producing a polybutyl methacrylate polymerizate with long polybutyl methacrylate side chains. Such polymerizates are of particular interest as thickeners with short tear-off lengths. The use of solvent L can also be eliminated whenever the monomers $M_1$ and $M_2$ form compatible homopolymerizates or copolymerizates. In this connection, it is especially preferred if the polymerizate P1 formed from $M_1$ and the polymerizate P2 formed from $M_2$ form compatible mixtures with UCST (Upper Critical Solution Temperature) behavior. With regard to UCST behavior, see, for example, D. R. Paul, Polymer Blends and Mixtures, Martinus Nijhoff Publishers, Dorarecht, Boston, 1985.

The monomers $M_1$ which are used are preferably acrylic and methacrylic compounds with the Formula I

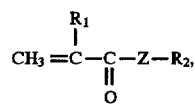

where $R_1$ is hydrogen or methyl $R_2$ is alkyl, aryl or cycloalkyl optionally substituted with a group containing 1 to 30 carbon atoms, and Z is O, NH or $NR_2$ or $(O-(CH_2)_x)_m-O$, where x is a whole number between 2 and 6 and m is a whole number between 1 and 50.

or mixtures of various monomers $M_1$.

As examples of alkyl (meth)acrylic compounds, the following can be used: methyl (meth)acrylate, ethyl (meth)acrylate, butyl (meth)acrylate, octyl (meth)acrylate, dodecyl (meth)acrylate, hexadecyl (meth)acrylate, eicosyl (meth)acrylate, (meth)acrylamide, N-methyl (meth)acrylamide, N,N-dimethyl (meth)acrylamide, N-t-butyl (meth)acrylamide, hydroxymethyl (meth)acrylate, 2-hydroxyethyl (meth)acrylate, 2-methoxyethyl (meth)acrylate, 2-butoxyethyl (meth)acrylate, 2-methyl ethyl (meth)acrylate, 2-ethyl hexyl (meth)acrylate, 2,2,3,3-tetrafluouopropyl (meth)acrylate, 6-chlorohexyl (meth)acrylate, (meth)acrylic acid esters of ethoxylated fatty alcohols with 5 to 25 ethylene glycol units as well as (meth)acrylic acid esters of nonyl phenoxypolyethylene glycol with 5 to 40 ethylene glycol units. Examples of all (meth)acryl compounds are phenyl (meth)acrylate, 1-phenyl ethyl (meth)acrylate, benzyl (meth)acrylate, N-phenyl (meth)acrylamide, N-benzyl (meth)acrylamide, 4-hydroxyphenyl (meth)acrylate, naphthyl (meth)acrylate, 9-fluorenyl (meth)acrylate, as well as pentafluouophenyl (meth)acrylate.

As examples of cycloalkyl (meth)acrylic compounds, the following can be used: cyclopentyl (meth)acrylate, cyclohexyl (meth)acrylate, cyclooctyl (meth)acrylate, 3,3,5-trimethyl cyclohexyl (meth)acrylate, 3-cyclohexyl propyl (meth)acrylate, N- cyclohexyl (meth)acrylamide, 4-hydroxycyclohexyl (meth)acrylate or 4-fluorocyclohexyl (meth)acrylate.

As regulator monomers RM, mercaptans with an ethylene-unsaturated, radically polymerizable group are used.

Alkyl (meth)acrylic compounds or alkyl maleic imide compounds with a mercapto group on the alkyl remainder are preferred for use. Examples for alkyi (meth)acrylic compounds RM are preferably 2-mercaptoalkyl (meth) acrylate or ω-mercapto(meth)acrylarmides such as 3-mercaptopropyl (meth)acrylate, 6-mercaptohexyl (meth) acrylate, 8-mercaptooctyl (meth)acrylate, 11-mercaptoundecyl (meth)acrylate, 4-mercaptobutyl (meth)acrylamide, as well as especially preferably 2-mercaptoethyl (meth)acrylate. As examples for alkyl maleic imide compounds, the following can be used: 3-mercaptopropyl maleic imide, 6-mercaptohexyl maleic imide, 11-mercaptoundecyl malelc imide as well as preferably 2-mercaptoethyl maleic imide.

With regard to the monomers $M_1$, which form the macromonomers $MM_1$ in an intermediary step, together with the regulator monomers RM, the regulator monomers have transfer constants $C_x$ in the range between 0.1 and 20, preferably 0.4 to 2 (for a determination and definition of the transfer constant see, for example: J. Brandrup, E. H. Immergut, Polymer Handbook, 3rd Ed., pages II/81 to 152, J. Wiley, N.Y., 1989). The polymerizing otefinic double bond of the regulator monomers RM has a r-parameter in the range between 0.1 and 10, preferably between 0.2 and 3 (for a determination and definition or the r-parameter see, for example: J. Brandrup, E. H. Immergut, Polymer Handbook, 3rd Ed., pages II/153 to 266, J. Wiley, N.Y., 1989). The first reaction stage is conducted in a suitable reactor equipped with a stirrer and a heating device, preferably under a conventional protective gas such as nitrogen or argon. Optionally, 0 to 100 parts by weight of the solvent L are added, with 10 to 500 parts by weight, preferably 20 to 300 parts by weight of monomer $M_1$ or mixtures of different monomers $M_1$ as well as 0.1 to 20 parts by weight, preferably 0.2 to 5 parts by weight of the regulator monomer RM, being added to it, simultaneously or consecutively. With the usual amounts of polymerization initiators PI, for example 0.001 to 2% by weight based on the amount of the monomers $M_1$, polymerization is started while heating, for example to 50° to 100° C., and the mixture is polymerized over a certain period, for example 1 to 10 hours. The conversion yield of monomers $M_1$ and regulator monomers RM generally amounts to between 50 and 95% in the first reaction stage, based on the amount of $M_1$ and RM used.

The Second Reaction Stage

The mixture of copolymers $MM_1$ of RM and $M_1$, with and without end double bonds (polymers with mercapto groups), formed in the first reaction stage, and of the remaining monomers $M_1$ and RM in the solvent L, is preferably converted with monomers $M_2$ in the same reactor. Just like the monomers $M_1$, the monomers $M_2$ used in this are preferably acrylic or methacrylic compounds of the Formula I, as described above. Furthermore, mixtures of different monomers can be used as monomers $M_2$, preferably mixtures of monomers with the Formula I.

The ratio of the transfer constants $C_x$ of the regulator monomer RM to the monomer $M_1$, i.e., of RM to the monomer $M_2$, taking into consideration the r-parameters of RM and $M_1$, or RM and $M_2$, is significant for the invention. For example, in case of a low transfer constant $C_x$ for example at 0.1, and r-parameters for RM and $M_1$ of <1 in each instance, for example 0.4 in each instance, the regulator monomer is used up very quickly at the beginning of the reaction, forming alternating copolymers $(RM-M_1)_n$. Subsequently, polymer branches from the monomers $M_1$ and later $M_2$ are polymerized via the SH groups of the regulator monomers, and star-shaped polymers are obtained. This is promoted by a high proportion of monomers $M_2$ relative to the monomers $M_1$, and a high proportion of regulator monomers RM relative to monomers $M_1$. Binding of the polymer chain from $M_2$ to the copolymers from $M_1$ and RM takes place particularly well if the transfer constant $C_x$ of RM to $M_2$ is large, e.g., $C_x$=15. Such high transfer constants result, for example, when using vinyl aromatics, such as vinyl toluene, α-methyl styrene, and preferably styrene as the monomer component $M_2$.

On the other hand, with r-parameters $r_{RM}$<1 and $r_{M1}$>1 in the first stage, at $C_x$>0.5, unbranched macromonomers are primarily obtained, and these copolymerize with M2 in the second stage. In some cases, particularly in the production of branched polymerizates with certain rheologlcal properties, such as viscosity index improvement agents or thickeners, the monomers $M_1$ and $M_2$ are identical. It is preferred, however, if the monomers $M_1$ and $M_2$ are not identical, where the different glass temperature of polymerizates which are formed from $M_1$ on the one hand and from $M_2$ on the other hand, or the different degrees of hydrophilia of the monomers $M_1$ and $M_2$ can be used as differentiation criteria. For example, the production of thermoplastic elastomers becomes possible if methyl methacrylate is used as the monomer $M_1$ and butyl acrylate is used as the monomer $M_2$. Furthermore, motor oil additives with good oil solubility and a good dispersing effect for motor oils can be produced, if, for example, alkyl (meth)acrylate with alkyl groups which have 6 to 30 carbon atoms is used as monomer $M_1$ and hydroxy (meth)acrylate, alkyl (meth)acrylamide and/or (meth)acrylates of ethoxylated fatty alcohols or (meth) acrylates of ethoxylated, alkyl-substituted phenols are used as monomer $M_2$.

Before the beginning of the second reaction stage, another 10 to 1000 parts by weight of the solvent L are added to the mixture of copolymers $MM_1$ of RM and $M_1$, the remaining monomers $M_1$ and RM, as well as any solvent L, if necessary. Preferably, this addition takes place in the same reactor, in which the first reaction stage is also carried out.

After the addition of 10 to 2000 parts by weight of the monomer $M_2$, optionally in the solvent L, as well as 0.005 to 2 parts by weight of a saturated mercaptan GM as the molecular weight regulator, polymerization is continued, after addition of further polymerization initiators in usual amounts, for example 0.001 to 2% by weight based on the amount of the monomers $M_2$. As saturated molecular weight regulators GM, the following can be used, for example: thioglycolic acid, 2-mercaptoethanol, 2-ethyl hexyl thioglycol, butyl thioglycolate, octyl thioglycolate, n-butyl mercaptan, n-dodecyl mercaptan, tert, dodecyl mercaptan or methyl-3-mercaptopropionate. Again, preferably, polymerization takes place under protective gas, for example nitrogen or argon, at the usual temperatures, for example between 50° and 100° C.

After completion of polymerization in the second reaction stage, the final yield, based on the amount of the monomers $M_1$ and $M_2$, the copolymers $MM_1$ well as the regulator monomers RM is at least 90%, preferably at least 95%.

The polymerizates P which are formed can be isolated from the reaction mixture, for example, by precipitation with suitable precipitants, such as methanol, by distilling off the solvent L, as well as the non-converted low molecular weight components, or by degasification in a degasification extruder, unless the polymerization is completed directly in substance, for example in the form of bead polymerization. In this case, isolation of the branched polymerizates P takes place by means of filtering off the beads and subsequently washing the beads with water.

The branched polymerizates P are excellently suited as thermoplastic elastomers (TPEs), if the monomers $M_1$ form polymers with a glass transition temperature of more than 50° C. and the monomers $M_2$ form polymers with a glass transition temperature of less than 0° C. (for a determination of the glass temperature see, for example, A. Turi, "Thermal Characterization of Polymeric Materials," pages 169 ff, Academic Press, N.Y., 1981). Such thermoplastic elastomers made from branched polymerizates P demonstrate a high level of elongation to tear at comparatively high tear tensions. The TPEs made from polymerizates P can also contain known additives such as stabilizers, processing aids, etc., in the usual amounts (see Gaechter-Müller, Kunststoff-Additive (Plastics Additives), Carl Hauser, Munich, N.Y., 1979; Ullmann's Encyclopedia of Industrial Chemistry, 5th Ed., Vol. A20, pages 459 to 537, Verlag Chemie, Weinheim, N.Y., 1992).

Films of TPEs consisting of polymerizate P can be used, for example, for the production of shatter-free laminate glass systems, in that such films are placed between the panes of glass to be connected and pressed into a laminate.

Furthermore, using the method according to the invention, it is possible to produce polymerizates in which the monomers $M_1$ and $M_2$ are identical, which, in and of themselves, have comparatively low viscosities at high molecular weights, because of their extreme degree of branching. This is of particular interest in the case of alkyl methacrylate molding masses.

It should be pointed out that the morphology of the polymerizates P can be varied, within wide limits, by means of the ratio of the amount of monomers $(M_1+RM)$ to $M_2$. For example, when using 10 parts $(M_1=RM)$ in the first stage, with a proportion of 5% by weight RM with reference to $M_1$, and with 90 parts $M_2$ in the subsequent polymerization in the second stage, one finds almost star-shaped polymers, while with a large proportion of $M_1$ relative to $M_2$, comb polymers are obtained, instead.

However, polymerizates P in which the monomers $M_1$ and $M_2$ are different, as in the case of the TPEs already mentioned, are preferred, since a greater number of different areas of application is obtainable with such polymerizates P. Examples mentioned are branched polymerizates P with alkyl (meth)acrylates with alkyl groups with 6 to 30 carbon atoms as monomer $M_1$, as well as with hydrophilic monomers $M_2$, for example hydroxy (meth)acrylate alkyl (meth) acrylamide and/or (meth)acrylic acid esters of ethoxylated fatty alcohols, which can be used as motor oil additives with good oil solubility to improve the viscosity index, and, at the same time to improve the dispersing effect on dirt and friction wear particles in motor oil. Furthermore, there are still numerous application possibilities in the lacquer and adhesives sector.

In general, practically all areas of application which are opened up by the (co)polymerization of macromonomers can be covered with the branched polymers P.

Having generally described this invention, a further understanding can be obtained by reference to certain specific examples which are provided herein for purposes of illustration only and are not intended to be limiting unless otherwise specified.

To characterize the polymerizate P, the following determination methods are used:

| Tear strength | $\delta_R$ [MPa] | according to DIN 53455 |
| Elongation to tear | $\epsilon_R$ [%] | according to DIN 53455 |

EXAMPLES

Example 1

Production of the branched polymerizate P in two stages.

The production of the branched polymerizate P takes place in a 4 liter reactor with stirrer, reflux cooler and thermometer. In the first reaction stage, 200 g methyl methacrylate (monomer $M_1$), 100 g butyl acetate (solvent L), and 10 g of a 40% solution of 2-mercaptoethyl methacrylate (regulator monomer PM) in butyl acetate are added, and, after addition of 0.09 g 2,2'-azobis-(isobutyronitrile) as the polymerization initiator PI, polymerization takes place according to the dead-end method, at a temperature of about 90° C., for 3 hours, up to a conversion yield of about 65%, and then polymerization is continued for 0.5 hours at a temperature of 90° C.

In the second reaction stage, 1000 g butyl acetate (L), 390 g butyl acrylate $(M_2)$, 1.8 g tert. butyl perneodecanoate as the polymerization initiator PI, and 0.18 g dodecyl mercaptan as a molecular weight regulator are added to the mixture of polymethyl methacrylate macromonomers $(MM_2)$ terminated with 2-mercaptoethyl methacrylate, methyl methacrylate $(M_2)$ and 2-mercaptoethyl methacrylate obtained in the first stage, and polymerization takes place at 60° C. for 8 hours, up to a conversion yield of 97%. The branched polymerizate P is isolated as a glass-clear film, after pouring out the polymer solution and evaporating the solvent L.

The film, which is practically free of adhesion, has an elongation to tear of $\epsilon_R>300\%$ at a tear strength of $\sigma_R>3$ MPa.

Example 2

Production of a laminate glass with the polymerizate P according to Example 1.

A film of polymerizate P according to Example 1, with a thickness of approximately 3 mm, is pressed together with two panes of polymethyl methacrylate (Plexiglas® GS 233) with a thickness of 6 and 10 mm, respectively, for 10 minutes at 180° C. and 50 bar, yielding a laminate glass system. In both cases, a laminate glass is obtained which does not shatter under impact stress.

The disclosure of foreign priority document, German Patent Application 195 24 053.7, filed Jul. 1, 1995, is hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method for producing branched polymerizates by radical polymerization of monomers in two stages comprising in a first stage, adding 10 to 500 parts by weight of at least one monomer $M_1$ and 0.1 to 20 parts by weight of a mercaptan with an olefinic, radically polymerizable double bond RM, and polymerizing said at least one monomer $M_1$ and mercaptan RM to form a copolymer $M_1$, containing mercapto groups, in the presence of at least one polymerization initiator and 0 to 100 parts by weight of an inert, non-aqueous solvent, which completely dissolves the monomer $M_1$, the mercaptan RM and the copolymer $MM_1$, wherein the polymerizable double bonds of $M_1$ and RM have a reactivity, expressed by a copolymerization parameter r, between 0.1 and 10, and in a second stage, adding 10 to 2000 parts by weight of a monomer $M_2$ and 0.01 to 10 parts by weight of a saturated molecular weight regulator, and optionally, an inert, non-aqueous solvent, to the reaction mixture formed in the first stage, and polymerizing in the presence of at least one polymerization initiator to form a branched polymerizate wherein polymer branches are polymerized via the SH groups.

2. The method according to claim 1, wherein the monomers $M_1$ and $M_2$ are identical.

3. The method according to claim 1, wherein the monomers $M_1$ and $M_2$ are different.

4. The method according to claim 2, wherein the monomers $M_1$ and/or $M_2$ have the Formula I:

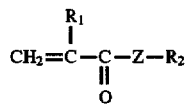   (I)

where $R_1$ is hydrogen or methyl, $R_2$ is for alkyl, aryl or cycloalkyl, optionally substituted with a group containing 1 to 30 carbon atoms, and Z is O, NH or $NR_2$ or $(O-(CH_2)_x)_m-O$, wherein x is a whole number between 2 and 6 and m is a whole number between 1 and 50.

5. The method according to claim 3, wherein the monomers $M_1$ and/or $M_2$ have the Formula I:

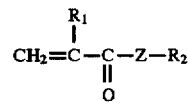   (I)

where $R_1$ is hydrogen or methyl, $R_2$ is for alkyl, aryl or cycloalkyl, optionally substituted with a group containing 1 to 30 carbon atoms, and Z is O, NH or $NR_2$ or $(O-(CH_2)_x)_m-O$, wherein x is a whole number between 2 and 6 and m is a whole number between 1 and 50.

6. The method according to claim 2, wherein the two reaction stages are carried out in the same reaction vessel.

7. The method according to claim 3, wherein the two reaction stages are carried out in the same reaction vessel.

8. The method according to claim 1, wherein the pair of monomer $M_1$ and RM has copolymerization parameters r between 0.2 and 3.

9. The method according to claim 1, wherein the transfer constants $C_x$ of the mercaptan with regard to the monomer $M_1$ are between 0.1 and 20.

10. The method according to claim 1, wherein the final conversion yield of monomers $M_1$ and $M_2$ after the second reaction stage is at least 95%, based on the amount of monomers $M_1$ and $M_2$ used.

* * * * *

UNITED STATES PATENT AND TRADEMARK OFFICE
CERTIFICATE OF CORRECTION

PATENT NO. : 5,693,717
DATED : DECEMBER 2, 1997
INVENTOR(S) : MARTINA PFIRMANN, ET AL

It is certified that error appears in the above-identified patent and that said Letters Patent is hereby corrected as shown below:

Abstract, line 7, before "mercaptan" insert -- and --.
Column 1, line 8, "branched polymerizites" should read --branched polymerizates--;

line 11, "radically pclymerizable" should read --radically polymerizable--.

Column 2, line 4, "containing mulfur" should read --containing sulfur--;
line 63, "and polymerizod" should read --and polymerized--;
line 64, "saturated moteculmr" should read --saturated molecular--.

Column 3, formula (I)

"
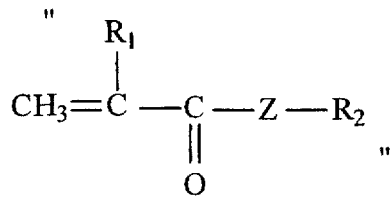
"

should read --

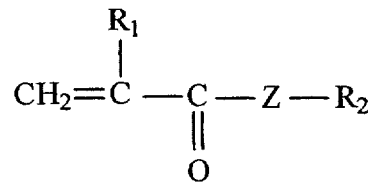

--.

UNITED STATES PATENT AND TRADEMARK OFFICE
CERTIFICATE OF CORRECTION

PATENT NO. : 5,693,717
DATED : DECEMBER 2, 1997
INVENTOR(S) : MARTINA PFIRMANN, ET AL

It is certified that error appears in the above-identified patent and that said Letters Patent is hereby corrected as shown below:

Column 3, line 58, "perpivilate, t-butyl" should read --perpivalate, t-butyl--;
line, 61, "t-amyl perpivilate" should read --t-amyl perpivalate--.

Column 4, line 18, "Dorarecht, Boston" should read --Dordrecht, Boston--;
formula (I), lines 21-25,

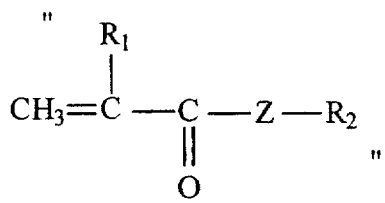

should read --

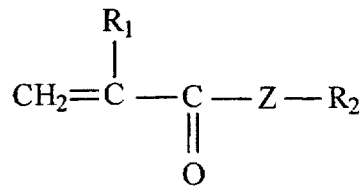

--.

UNITED STATES PATENT AND TRADEMARK OFFICE
CERTIFICATE OF CORRECTION

PATENT NO. : 5,693,717
DATED : DECEMBER 2, 1997
INVENTOR(S) : MARTINA PFIRMANN, ET AL

It is certified that error appears in the above-identified patent and that said Letters Patent is hereby corrected as shown below:

Column 4, line 44 "tetrafluouopropyl" should read --tetrafluoropropyl--;
line 53, "pentafluouophenyl" should read --pentafluorophenyl--;
line 67 "alkyi" should read --alkyl--.

Column 5, line 2, "ω-mercapto(meth)acrylarmides" should read
--ω-mercapto(meth)acrylamides--;
line 10, "malelc imide" should read --maleic imide--;
line 19, "otefinic double" should read --olefinic double--.

Column 6, line 9 "with M2 in" should read --with $M_2$ in--.

Column 7, line 10, "Carl Hauser. Munich" should read --Carl Hanser, Munich--;
line 16, "oi shatter-free" should read --of shatter-free--;
line 26, "($M_1$=RM)" should read --($M_1$+RM)--.

Column 8, line 4 "(regulator monomer PM)" should read --(regulator monomer RM)--;
line 15, "($MM_2$) should read --($MM_1$)--.

UNITED STATES PATENT AND TRADEMARK OFFICE
CERTIFICATE OF CORRECTION

PATENT NO. : 5,693,717
DATED : DECEMBER 2, 1997
INVENTOR(S) : MARTINA PFIRMANN, ET AL

It is certified that error appears in the above-identified patent and that said Letters Patent is hereby corrected as shown below:

Column 8, line 17, "$(M_2)$" should read --$(M_1)$--;
line 58, "$M_1$, containing" should read --$MM_1$, containing--.

Signed and Sealed this

Twenty-fourth Day of November, 1998

BRUCE LEHMAN

Attest:

Attesting Officer

Commissioner of Patents and Trademarks